US009910851B2

(12) United States Patent
Wang et al.

(10) Patent No.: US 9,910,851 B2
(45) Date of Patent: Mar. 6, 2018

(54) ON-LINE VOICE TRANSLATION METHOD AND DEVICE (71) Applicant: BEIJING BAIDU NETCOM SCIENCE AND TECHNOLOGY CO., LTD., Beijing (CN)

(72) Inventors: Haifeng Wang, Beijing (CN); Hua Wu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/893,008

(22) PCT Filed: Nov. 12, 2014

(86) PCT No.: PCT/CN2014/090937
§ 371 (c)(1),
(2) Date: Nov. 20, 2015

(87) PCT Pub. No.: WO2015/096564
PCT Pub. Date: Jul. 2, 2015

(65) Prior Publication Data
US 2016/0147744 A1 May 26, 2016

(30) Foreign Application Priority Data
Dec. 25, 2013 (CN) .......................... 2013 1 0728312

(51) Int. Cl.
*G06F 17/28* (2006.01)
*G06F 17/30* (2006.01)
(Continued)

(52) U.S. Cl.
CPC ........ *G06F 17/2854* (2013.01); *G06F 17/289* (2013.01); *G06F 17/2845* (2013.01); *G10L 15/005* (2013.01); *G10L 15/01* (2013.01)

(58) Field of Classification Search
CPC ............... G06F 17/2818; G06F 17/289; G06F 17/2836; G06F 17/28; G10L 15/26; G10L 15/08; G10L 25/51; G10L 2015/088
See application file for complete search history.

(56) References Cited

U.S. PATENT DOCUMENTS 6,345,253 B1 * 2/2002 Viswanathan .... G06F 17/30746
704/251
6,567,778 B1 * 5/2003 Chao Chang ......... G06F 17/278
704/257

(Continued)

FOREIGN PATENT DOCUMENTS

CN        1932807 A    3/2007
CN     101937431 A    1/2011
(Continued)

OTHER PUBLICATIONS

Cox, Stephen, and Srinandan Dasmahapatra. "High-level approaches to confidence estimation in speech recognition." IEEE Transactions on Speech and Audio processing 10.7 (2002): 460-471.*

(Continued)

Primary Examiner — Matthew Baker
(74) Attorney, Agent, or Firm — Seed IP Law Group LLP (57) ABSTRACT

Disclosed are on-line voice translation method and device. The method comprises: conducting voice recognition on first voice information input by a first user, so as to obtain first recognition information; prompting the first user to confirm the first recognition information; translating the confirmed first recognition information to obtain and output first translation information; extracting, according to second information which is fed back by a second user, associated information corresponding to the second information; and correcting the first translation information according to the associated information and outputting the corrected transla- (Continued)

tion information. By means of the on-line voice translation method and device, smooth communication can be ensured in cross-language exchanges.

13 Claims, 5 Drawing Sheets

(51) Int. Cl.
  *G10L 15/01* (2013.01)
  *G10L 15/00* (2013.01)

(56) References Cited

U.S. PATENT DOCUMENTS

| | | | | |
|---|---|---|---|---|
| 6,879,956 B1* | 4/2005 | Honda | ................... | G10L 15/075 704/244 |
| 6,952,665 B1 | 10/2005 | Shimomura et al. | | |
| 8,694,305 B1* | 4/2014 | Grove | ..................... | G06F 17/28 704/1 |
| 8,793,261 B2* | 7/2014 | Jiang | ................. | G06F 17/30616 704/9 |
| 9,202,458 B2* | 12/2015 | Braho | ................... | G10L 15/065 |
| 2002/0059069 A1* | 5/2002 | Hsu | ......................... | G10L 15/18 704/257 |
| 2004/0044516 A1* | 3/2004 | Kennewick | ............. | G10L 15/22 704/5 |
| 2007/0061152 A1 | 3/2007 | Doi | | |
| 2007/0294076 A1* | 12/2007 | Shore | ................. | G06F 17/2836 704/2 |
| 2009/0192782 A1* | 7/2009 | Drewes | .............. | G06F 17/2818 704/3 |
| 2011/0264652 A1* | 10/2011 | Roberge | .................. | G10L 15/08 707/723 |
| 2013/0158982 A1* | 6/2013 | Zechner | .................. | G06F 17/28 704/9 |
| 2013/0339021 A1* | 12/2013 | Deshmukh | .............. | G10L 15/18 704/257 |
| 2014/0222435 A1* | 8/2014 | Li | ....................... | G01C 21/3608 704/275 |
| 2014/0297252 A1* | 10/2014 | Prasad | ................... | G06F 17/289 704/2 |
| 2014/0380286 A1* | 12/2014 | Gabel | ....................... | G06F 8/20 717/139 |
| 2015/0317302 A1* | 11/2015 | Liu | ......................... | G06F 17/28 704/9 |
| 2016/0133256 A1* | 5/2016 | Lembersky | ............. | G10L 15/26 704/235 |

FOREIGN PATENT DOCUMENTS

| | | |
|---|---|---|
| CN | 102055855 A | 5/2011 |
| CN | 103744843 A | 4/2014 |
| JP | 2003-29779 A | 1/2003 |
| JP | 2008-9153 A | 1/2008 |
| KR | 10-2005-0052943 A | 6/2005 |
| WO | 2013/134106 A2 | 9/2013 |

OTHER PUBLICATIONS

International Search Report for PCT/CN2014/090937 dated Jan. 28, 2015, 2 pages.

* cited by examiner

ON-LINE VOICE TRANSLATION METHOD AND DEVICE

This application claims priority of the Chinese Patent Application No. 201310728312.X, filed on Dec. 25, 2013 and entitled "ON-LINE VOICE TRANSLATION METHOD AND DEVICE" by BEIJING BAIDU NETCOM SCIENCE AND TECHNOLOGY CO., LTD., which is incorporated herein by reference in its entirety.

TECHNICAL FIELD

Embodiments of the present invention relate to the field of on-line translation technologies, and in particular, to an on-line voice translation method and device.

BACKGROUND

Along with the increase of international exchanges, language communications in different languages are increasingly frequent. To overcome language barriers, on-line voice translation based on clients has been widely applied.

The on-line translation generally relates to two processes. The first one is conducting voice recognition, i.e., recognizing a first language voice input by a first user into text information. The second one is translating the text information based on a translation corpus, so as to generate voice information or text information in a second language, providing to a second user. By means of the on-line voice translation, translation services may be provided to both parties of users using different languages, so that the both parties can communicate smoothly.

Currently, during the on-line voice translation, errors may occur in the voice recognition and translation processes, which cause non-smooth communication in cross-language exchange, resulting in the cross-language communication cannot be conducted.

SUMMARY

The present invention provides an on-line voice translation method and device, so as to improve the accuracy of on-line voice translation, and ensure smooth communication in cross-language exchanges.

In one aspect, an embodiment of the present invention provides an on-line voice translation method, including:

conducting voice recognition on first voice information input by a first user, so as to obtain first recognition information;

prompting the first user to confirm the first recognition information;

translating the confirmed first recognition information to obtain and output first translation information;

extracting, according to second information which is fed back by a second user, associated information corresponding to the second information; and correcting the first translation information according to the associated information and outputting the corrected translation information.

Preferably, prompting the first user to confirm the first recognition information comprises:

determining a degree of confidence of the first recognition information; and prompting the first user to confirm the first recognition information according to the degree of confidence of the first recognition information.

Preferably, determining the degree of confidence of the first recognition information comprises:

determining the degree of confidence of the first recognition information according to a key word and/or a language rule in a current dialogue scene.

Preferably, prompting the first user to confirm the first recognition information according to the degree of confidence of the first recognition information comprises:

if the degree of confidence of the first recognition information is lower than a first preset threshold, displaying the first recognition information for the first user to confirm; or if the degree of confidence of at least one key word in the first recognition information is lower than a second preset threshold, displaying the key word for the first user to confirm.

Preferably, extracting, according to second information which is fed back by a second user, associated information corresponding to the second information comprises:

conducting key word similarity matching on the second information which is fed back by the second user with the confirmed first recognition information, and extracting a matched key word to serve as the associated information.

Preferably, extracting, according to second information which is fed back by a second user, associated information corresponding to the second information comprises:

extracting the associated information from the confirmed first recognition information according to a key word and/or a language rule in a current dialogue scene.

Preferably, the method further includes:

determining the current dialogue scene according to the first recognition information, or recognizing the current dialogue scene according to a key word in historical recognition information which has been confirmed by the first user.

In another aspect, an embodiment of the present invention further provides an on-line voice translation device, including:

a first recognition information module, configured to conduct voice recognition on first voice information input by a first user, so as to obtain first recognition information;

a confirmation prompt module, configured to prompt the first user to confirm the first recognition information;

an information translation module, configured to translate the confirmed first recognition information to obtain and output first translation information;

an associated information extraction module, configured to extract, according to second information which is fed back by a second user, associated information corresponding to the second information; and an information correction module, configured to correct the first translation information according to the associated information and output the corrected translation information.

Preferably, the confirmation prompt module includes:

a degree of confidence determination module, configured to determine a degree of confidence of the first recognition information; and a user confirmation module, configured to prompt the first user to confirm the first recognition information according to the degree of confidence of the first recognition information.

Preferably, the degree of confidence determination module is specifically configured to determine the degree of confidence of the first recognition information according to a key word and/or a language rule in a current dialogue scene.

Preferably, the confirmation prompt module is specifically configured to:

if the degree of confidence of the first recognition information is lower than a first preset threshold, display the first recognition information for the first user to confirm; or if the degree of confidence of at least one key word in the first recognition information is lower than a second preset threshold, display the key word for the first user to confirm.

Preferably, the associated information extraction module includes:

a key word matching sub-module, configured to conduct key word similarity matching on the second information which is fed back by the second user with the confirmed first recognition information, and extract a matched key word to serve as the associated information.

Preferably, the associated information extraction module includes:

a language rule sub-module, configured to extract the associated information from the confirmed first recognition information according to a key word and/or a language rule in a current dialogue scene.

Preferably, the device further includes:

a dialogue scene determination module, configured to determine the current dialogue scene according to the first recognition information, or recognize the current dialogue scene according to a key word in historical recognition information which has been confirmed by the first user.

An embodiment of the present invention further provides a storage medium comprising computer executable instructions, the computer executable instructions, when being executed by a computer processor, executing an on-line voice translation method, wherein the method comprises:

conducting voice recognition on first voice information input by a first user, so as to obtain first recognition information;

prompting the first user to confirm the first recognition information;

translating the confirmed first recognition information to obtain and output first translation information;

extracting, according to second information which is fed back by a second user, associated information corresponding to the second information; and correcting the first translation information according to the associated information and outputting the corrected translation information.

In embodiments of the present invention, the first user is prompted to confirm a recognition result of the first recognition information, so as to avoid errors during voice recognition, and improve the accuracy of the recognition information. Moreover, by extracting the associated information corresponding to second information which is fed back by the second user according to the second information, the first translation information is corrected and the corrected translation information is output, thereby improving the accuracy of cross-language translation.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings described in the following are merely some embodiments recorded in the present invention, and a person of ordinary skill in the art may still perform modification and replacement on these accompanying drawings without creative efforts.

DETAILED DESCRIPTION

The technical solutions in embodiments of the present invention will be described clearly and completely with reference to the accompanying drawings. Apparently, the described embodiments are merely a part of embodiments of the present invention, and are not all the embodiments, intended to describe the principle of the present invention instead of limiting the present invention to the specific embodiments. Based on the embodiments of the present invention, all other embodiments derived by a person of ordinary skill in the art without any creative effort shall fall within the protection scope of the present invention.

Embodiment 1

Figure 1:
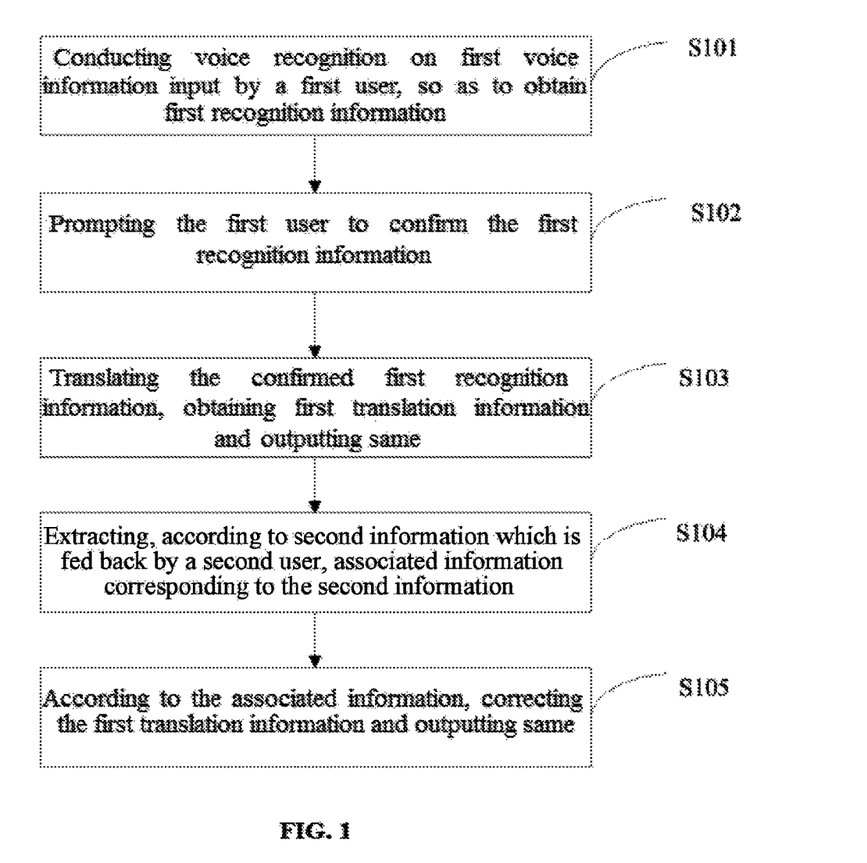
FIG. 1 is a schematic flow chart of an on-line voice translation method according to Embodiment 1 of the present invention.

FIG. 1 is a schematic flow chart of an on-line voice translation method according to Embodiment 1 of the present invention. This embodiment is applicable to a situation of conducting voice recognition and translation when both parties perform cross-language voice exchanges. The method may be executed by means of an on-line voice translation device, which may be implemented with hardware and/or software, and may be disposed in any terminal or network element. The method specifically includes the following steps:

In step S101, voice recognition is conducted on first voice information input by a first user, so as to obtain first recognition information.

In the above operation, the first user performs cross-language exchanges with a second user. The first user may adopt the first voice to input the first voice information. The on-line voice translation device may conduct voice recognition on the first voice information, so as to obtain the first recognition information.

In step S102, the first user is prompt to confirm the first recognition information.

In the above operation, the first recognition information may be displayed on a display screen. The first user may confirm the first recognition information by using an input apparatus such as a touch screen, a keyboard, and a mouse.

The operation may be prompting all of the acquired first recognition information for the user to confirm. However, preferably, the acquired first recognition information is selectively provided for the user to confirm according to a set triggering condition. More preferably, the degree of confidence of the first recognition information is determined; and the first user is prompted to confirm the first recognition information according to the degree of confidence of the first recognition information.

The degree of confidence may be used to indicate the correctness of the first recognition information, for example, the degree of error from the original meaning of the first voice information input by the first user, a recognition rate of the first recognition information, the degree of error from a standard word in a lexicon, and the like. The process of determining the degree of confidence may include: matching the first recognition information in a standard lexicon, so as to determine whether a rate of correctly recognized words reaches a set limit, or determine whether the first recognition information meets a set rule, for example, a grammar requirement. During actual use, the degree of confidence of all the first recognition information may be determined; or at least one key word in the first recognition information is selected, and the degree of confidence of the key word is determined.

In the step of prompting the user according to the degree of confidence of the first recognition information, preferably, if the degree of confidence of the first recognition information is lower than a first preset threshold, the first recognition information is displayed for the first user to confirm; or, if the degree of confidence of at least one key word in the first recognition information is lower than a second preset threshold, the key word is displayed for the first user to confirm.

In step S103, the confirmed first recognition information is translated to obtain and output first translation information.

In the above operation, the first recognition information is translated from the language used by the first user to a language used by the second user. For example, the first recognition information in Chinese is translated to obtain the first translation information in English. Two users may use two terminals provided with on-line voice translation devices. A terminal of the first user may output the first translation information to a terminal of the second user through a wired network or a wireless network.

In step S104, according to second information which is fed back by the second user, associated information corresponding to the second information are extracted.

In the above operation, the second information which is fed back by the second user can also be returned to the terminal of the first user by means of interaction between the terminals. The associated information corresponding to the second information is information that can rectify correctness of the first translation information. For example, the associated information may be a single word or a phrase in the confirmed first recognition information meeting a set similarity with the second information, or information having set logic association with the second information. For example, the second information may be rhetorical question information directed to the first translation information, and the associated information corresponding to the second information may be an answer to the second information.

The associated information may be obtained by, for example: conducting key word similarity matching on the second information which is fed back by the second user with the confirmed first recognition information, and extracting a matched key word to serve as the associated information corresponding to the second information. For example, the first user said: " 从北京到 天津怎么走？(How to go Tianjin from Beijing?)" If the second user asked: "To where", it indicates that the translation of Tianjin may be wrong, resulting in the second user cannot understand it. Then, similarity matching is conducted on the second information "To where" and the confirmed first recognition information " 从北京 到天津怎么走？", and information more concerned by the second user is acquired to serve as information that needs to be corrected.

In step S105, according to the associated information, the first translation information is corrected and the corrected translation information is output.

In the above operation, all of the first translation information may be corrected and output, so as to prevent from missing any information. Alternatively, a part of the first translation information, for example, some key words, may be corrected and output. Compared with translating a segment of information, translating key words therein has higher arruracy, thereby improving the correctness of correction. Moreover, processing a part of characters or words involves a small data amount for the data processing, thereby improving the efficiency of correcting and outputting the first translation information. Specifically, the output to the second user may be performed through a wired network or a wireless network. In this operation, it is unnecessary to display the first translation information for the first user to confirm; instead, the device automatically implements correction of the translation information, thereby improving the efficiency of translation.

In the on-line voice translation method disclosed in this embodiment, the first user is prompted to confirm a recognition result of the first recognition information, so as to avoid errors during voice recognition, and improve the accuracy of the recognition information. Moreover, by extracting the associated information corresponding to the second information according to the second information which is fed back by the second user, the first translation information is corrected and the corrected translation information is output, thereby improving the accuracy of cross-language translation.

Embodiment 2

Figure 2:
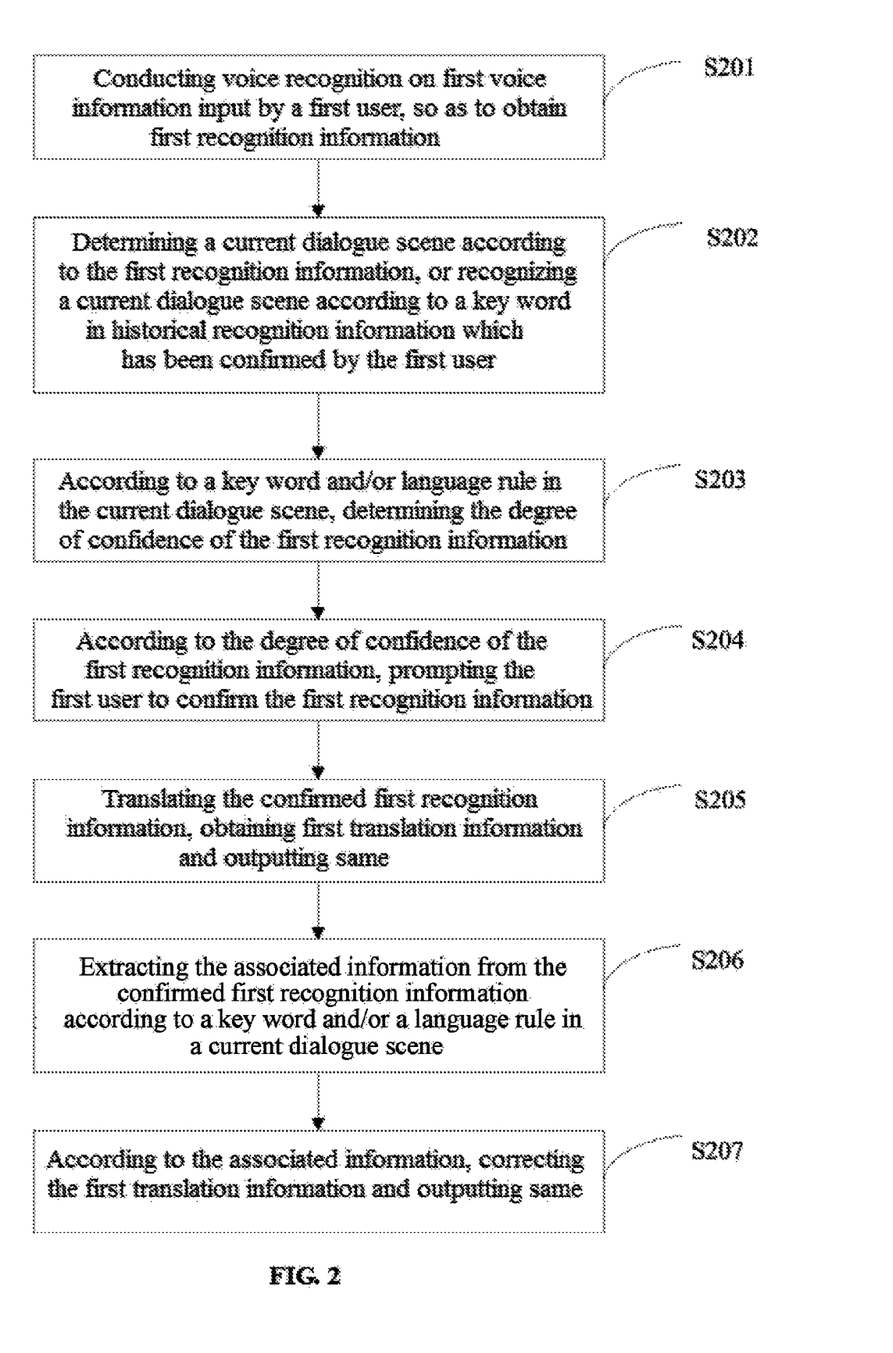
FIG. 2 is a schematic flow chart of an on-line voice translation method according to Embodiment 2 of the present invention.

FIG. 2 is a schematic flow chart of an on-line voice translation method according to Embodiment 2 of the present invention. In an actual process of exchanges between both parties, content of dialogue is generated based on a certain dialogue scene and a dialogue rule. Therefore, on the basis of Embodiment 1 of the present invention, Embodiment 2 of the present invention performs optimization on the on-line voice translation process based on the dialogue scene and the dialogue rule. An on-line voice translation method provided in Embodiment 2 includes the following steps:

In step S201, voice recognition is conducted on first voice information input by a first user, so as to obtain first recognition information.

In step S202, a current dialogue scene is determined according to the first recognition information, or recognized according to a key word in historical recognition information which has been confirmed by the first user.

In the above operation, some dialogue scenes and rules for determining the scenes may be preset. For example, the dialogue scenes may include an entertainment venues talking scene, a business talking scene, an academic discussing scene, a railway station talking scene, an airplane talking scene, and the like. The current dialogue scene may be determined according to a key word in the first recognition information. For example, when the key word is a place name of a scenery spot, it is determined that the current dialogue scene is a tourism scene. The current dialogue scene may also be recognized according to a key word in historical recognition information which has been confirmed by the first user in a preset time period. The information which has been confirmed by the first user before confirming the first recognition information is the historical recognition information. Definitely, the dialogue scene may also be selected by the user.

In step S203, according to a key word and/or a language rule in the current dialogue scene, the degree of confidence of the first recognition information is determined.

In the above operation, the key word in the current dialogue scene may be a common word in the scene, or a rare word in the scene. Therefore, the first recognition information may be compared with key words of the current dialogue scene. The degree of confidence is determined according to the probability of the common words and/or the rear words included in the current scene. When the first recognition information includes a common word, the degree of confidence of the first recognition information is high, and when the first recognition information includes a rear word, the first degree of confidence is low. For example, in the railway station dialogue scene, railway, railway ticket and time are common words, and words such as the Himalayas, walking stick and war are rear words. If the first recognition information includes words such as railway, railway ticket and time, the degree of confidence of the first recognition information is high; if the first recognition information includes words such as the Himalayas, walking stick and war, the degree of confidence of the first recognition information is low. The language rule may be a grammar rule, including, but not limited to, time, place, character, and event. When the first recognition information meets the grammar rule, the degree of confidence of the first recognition information is high; and when the first recognition information does not meet the grammar rule, the degree of confidence of the first recognition information is low.

In step S204, according to the degree of confidence of the first recognition information, the first user is prompt to confirm the first recognition information.

In the above operation, the first user is prompted in a visual manner to confirm the first recognition information, for example, by popping a box, a prompt confirm key, and the like. The first user may also be prompted in an audio manner to confirm the first recognition information, for example, by playing voice information for prompting.

In step S205, the confirmed first recognition information is translated to obtain first translation information and output the same.

In step S206, according to the key word and/or the language rule in the current dialogue scene, the associated information corresponding to second information which is fed back from a second user is extracted from the confirmed first recognition information.

In step S207, the first translation information is corrected according to the associated information, and the corrected translation information is output.

The on-line voice translation method disclosed in Embodiment 2 adds the scene management of dialogue, and further optimizes the accuracy of determining the degree of confidence and determining the associated information.

Embodiment 3

Figure 3:
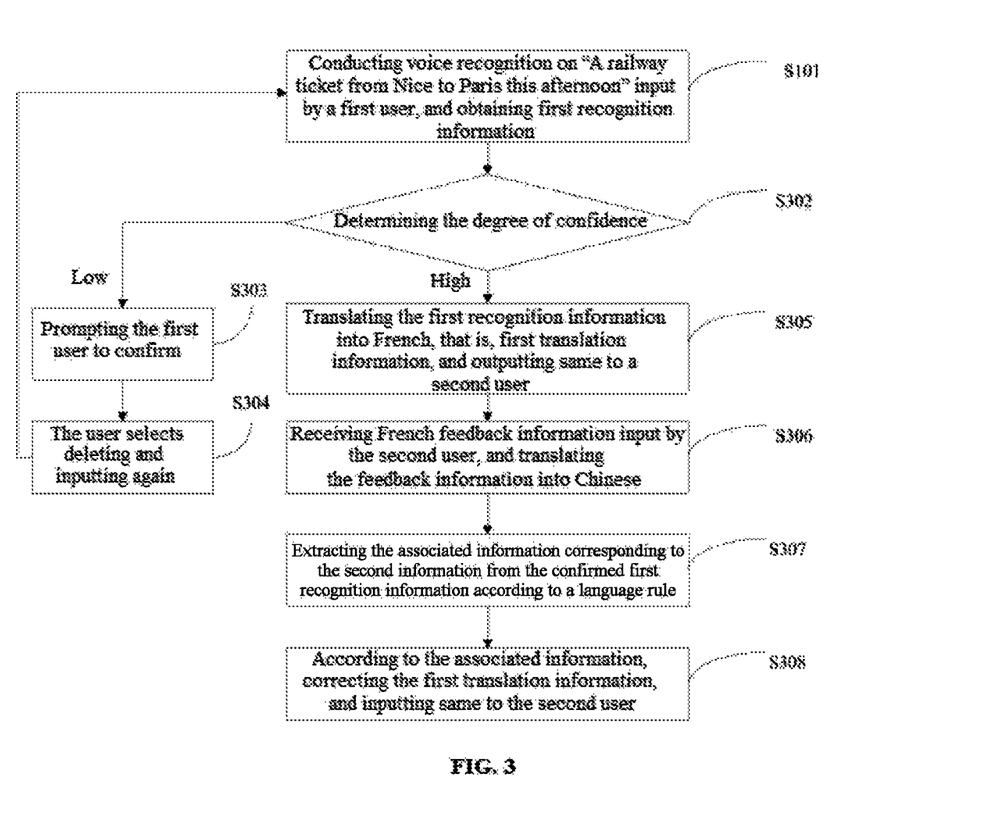
FIG. 3 is a schematic flow chart of an on-line voice translation method according to Embodiment 3 of the present invention.

FIG. 3 is a flow chart of an on-line voice translation method according to Embodiment 3 of the present invention. Based on the above embodiments provided in the present invention, Embodiment 3 provides a preferred implementation solution of an on-line voice translation method. Taking a first user is a Chinese user and a second user is a French user as an example, the method includes the following steps:

In step S301, the first user inputs "今天下午从尼斯去巴黎的火车票 (A train ticket from Nice to Paris for this afternoon)" in Chinese by using a microphone to serve as first voice information, on which voice recognition is conducted to obtain first recognition information. Due to various reasons such as accent and environment noise, the obtained recognition information may be "京大下午从 14 去巴黎的火车票".

In step S302, the degree of confidence of the obtained recognition information "京大下午从 14 去巴黎的火车票" is determined. If the degree of confidence is lower than a set threshold, the process goes to step S303; otherwise, the process goes to step S305.

Since words "下午 (afternoon)", "巴黎 (Paris)" and "火车票 (train ticket)" exist in the obtained recognition information "京大下午从 14 去巴黎的火车票", it is deduced according to a common grammar rule that it should be a dialogue about travelling from one place to another place. "京天 (it is not a meaningful word)" is neither a noun of time nor a noun of address. In the grammar rule of "从 14 去巴黎" that expresses an origin and a destination, "14" is not an address. Therefore, the degrees of confidence of "京天" and "14" are low, so that the process shall go to step S303.

In step S303, "京天下午从 14 去巴黎的火车票" is displayed on a display screen in text, so as to prompt the first user to confirm.

In step S304, the user selects deletion and inputs again, and the process returns to step S301 until the first recognition information "今天下午从尼斯 去巴黎的火车票" having a high degree of confidence is obtained.

In step S305, the first recognition information "今天下午从尼斯 去巴黎的火车票" is translated to "Un billet de train de Nice à Paris pour cet après-midi (A train ticket from Nice to Paris for this afternoon)" in French as first translation information, and the first translation information is output to the second user.

Here, errors may occur in the translation information due to esoteric words or various semantic meanings.

In step S306, feedback information in French is input by the second user, and translated into Chinese as second information. For example, the feedback information may be "D'où allez-vous à Paris? (From where do you go to Paris?)".

The feedback information in French may be directed used as the second information, or it may also be translated into Chinese and the translated Chinese information is used as the second information.

In step S307, according to the language rule, the associated information corresponding to the second information is extracted from the confirmed first recognition information.

In this example, the second information is "D'où allez-vous à Paris?". Based on the language rule, it is recognized that a point of departure is asked. In the first recognition information "今天下午从尼 斯去巴黎的火车票", "从尼斯去巴黎 (from Nice to Paris)" may reflect the origin and the destination according to the common grammar. Therefore, "尼斯 (Nice)" is extracted to serve as the associated information.

In step S308: According to the associated information, correct the first translation information and output same to the second user.

According to the associated information "尼斯", the first translation information is corrected into "Nice" in French, and is then output to the second user. Generally, translation of a single word or phrase by a translation system is relatively accurate, and therefore, the error rate of the translation may be reduced to some extent.

In the technical solution of Embodiment 3, a translation result of "京天" may be prevented from being output to the second user to cause non-smooth communication. Moreover, the translation result of "尼斯" may be corrected and output again, thereby ensuring smooth communication between both parties of the cross-language exchanges.

Embodiment 4

Figure 4:
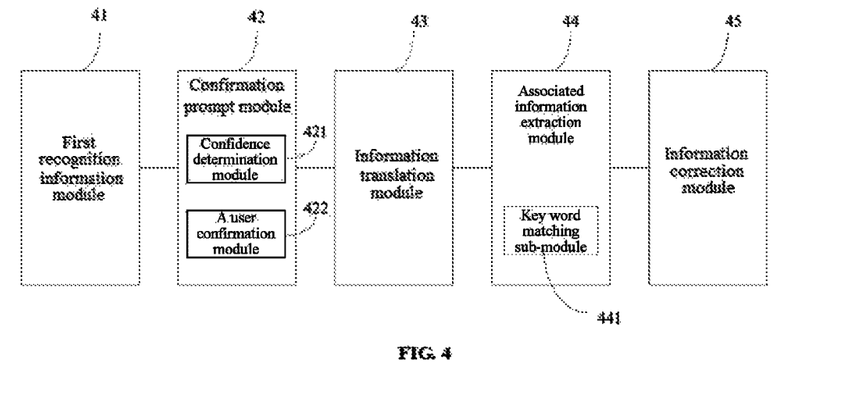
FIG. 4 is a schematic structural diagram of an on-line voice translation device according to Embodiment 4 of the present invention.

FIG. 4 is a schematic structural diagram of an on-line voice translation device according to Embodiment 4 of the present invention. This embodiment is applicable to a situation of conducting voice recognition and translation when both parties perform cross-language voice communication. The device may be disposed in any terminal or network element. The device specifically includes a first recognition information module 41, a confirmation prompt module 42, an information translation module 43, an associated information extraction module 44, and an information correction module 45.

The first recognition information module 41 is configured to conduct voice recognition on first voice information input by a first user, so as to obtain first recognition information. The confirmation prompt module 42 is configured to prompt the first user to confirm the first recognition information. The information translation module 43 is configured to translate the confirmed first recognition information to obtain first translation information and output the same. The associated information extraction module 44 is configured to extract associated information corresponding to second information which is fed back by a second user according to the second information. The information correction module 45 is configured to correct the first translation information and output same according to the associated information.

In the first recognition information module 41, the first user performs cross-language communication with a second user. The first user may adopt a first voice to input the first voice information, and the on-line voice translation device may conduct voice recognition on the first voice information, so as to obtain the first recognition information.

In the confirmation prompt module 42, the first recognition information may be displayed on a display screen, and the first user may confirm the first recognition information by using an input apparatus such as a touch screen, a keyboard, and a mouse.

It is possible that all of the acquired first recognition information are provided for the user to confirm. However, preferably, the acquired first recognition information is selectively provided according to a set triggering condition for the user to confirm.

The confirmation prompt module 42 includes a degree of confidence determination module 421 and a user confirmation module 422.

The degree of confidence determination module 421 is configured to determine the degree of confidence of the first recognition information; and the user confirmation module 422 is configured to prompt the first user to confirm the first recognition information according to the degree of confidence of the first recognition information.

In the degree of confidence determination module 421, the degree of confidence may be used to indicate the correctness of the first recognition information, for example, the degree of error from the original meaning of the first voice information input by the first user, a recognition rate of the first recognition information, and the degree of error from a standard word in a lexicon. The degree of confidence may be determined by matching the first recognition information with a standard lexicon, so as to determine whether a rate of correctly recognized words reaches a set limit, or determine whether the first recognition information meets a set rule, for example, a grammar requirement. During actual use, the degree of confidence of all the first recognition information may be determined; or at least one key word in the first recognition information is selected, and the degree of confidence of the key word is determined.

In the user confirmation module 422, the user is prompted according to the degree of confidence of the first recognition information. Preferably, if the degree of confidence of the first recognition information is lower than a first preset threshold, the first recognition information is displayed for the first user to confirm; or, if the degree of confidence of at least one key word in the first recognition information is lower than a second preset threshold, the key word is displayed for the first user to confirm.

In the information translation module 43, the first recognition information is translated from the language used by the first user to a language used by the second user. For example, the first recognition information in Chinese is translated to obtain the first translation information in English. The two users may respectively use two terminals provided with the on-line voice translation device. The terminal of the first user may output the first translation information to the terminal of the second user through a wired network or a wireless network.

In the associated information extraction module 44, the second information which is fed back by the second user can be returned to the terminal of the first user by means of interaction between the terminals. The associated information corresponding to the second information is information that can rectify correctness of the first translation information. For example, the associated information may be a single word or a phrase in the confirmed first recognition information meeting a set similarity with the second information, or information having set logic association with the second information. For example, the second information may be rhetorical question information directed to the first translation information, and the associated information corresponding to the second information may be an answer to the second information.

The associated information extraction module 44 includes a key word matching sub-module 441 configured to conduct key word similarity matching on the second information which is fed back by the second user with the confirmed first recognition information, and extract a matched key word to serve as the associated information corresponding to the second information. For example, the first user said: "从北京到天 津怎么走". If the second user asked: "To where", it indicates that the translation of "天津" may be wrong, so that the second user cannot understand it. Then, similarity matching is conducted on the second information "To where" and the confirmed first recognition information "从北京到天 津怎么走?", and information more concerned by the second user is acquired to serve as information that needs to be corrected.

In the information correction module 45, all of the first translation information may be corrected and output, so as to prevent from missing any information. Alternatively, a part of the first translation information may be corrected and output. For example, some key words therein may be corrected and output; since compared with translating a piece of information, the accuracy of translating key words is higher, thereby improving the correctness of correction.

Moreover, the data processing amount of processing a part of characters or words is small, thereby improving the efficiency of correcting and outputting the first translation information. Specifically, output information may be provided to the second user through a wired network or a wireless network. Therefore, it is unnecessary to display the first translation information for the first user to confirm; instead, the device automatically implements correction of the translation information, thereby improving the accuracy of translation.

In the on-line voice translation device disclosed in Embodiment 4, the first user is prompted to confirm a recognition result of the first recognition information, so as to avoid errors during voice recognition, and improve the accuracy of the recognition information. Moreover, by extracting the associated information corresponding to second information which is fed back by the second user according to the second information, the first translation information is corrected and then output, thereby improving the accuracy of cross-language translation.

Embodiment 5

Figure 5:
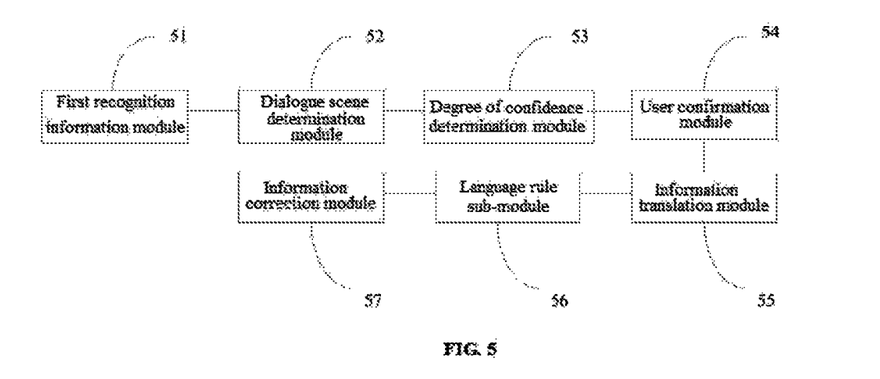
FIG. 5 is a schematic structural diagram of an on-line voice translation device according to Embodiment 5 of the present invention.

FIG. 5 is a schematic structural diagram of an on-line voice translation device according to Embodiment 5 of the present invention. In an actual process of exchanges of both parties, content of dialogue is generated based on a certain dialogue scene and a dialogue rule. Therefore, on the basis of Embodiment 4 of the present invention, Embodiment 5 of the present invention performs optimization on the on-line voice translation process based on the dialogue scene and the dialogue rule. The on-line voice translation device provided in this embodiment includes a first recognition information module 51, a dialogue scene determination module 52, a degree of confidence determination module 53, a user confirmation module 54, an information translation module 55, a language rule sub-module 56, and an information correction module 57.

The first recognition information module 51 is configured to conduct voice recognition on first voice information input by a first user, so as to obtain first recognition information. The dialogue scene determination module 52 is configured to determine a current dialogue scene according to the first recognition information, or recognize a current dialogue scene according to a key word in historical recognition information which has been confirmed by the first user. The degree of confidence determination module 53 is configured to determine the degree of confidence of the first recognition information. The confirmation prompt module 54 is configured to prompt the first user to confirm the first recognition information according to the degree of confidence of the first recognition information. The information translation module 55 is configured to translate the confirmed first recognition information to obtain first translation information and output the same. The language rule sub-module 56 is configured to extract associated information corresponding to second information which is fed back from a second user from the confirmed first recognition information according to a key word and/or language rule in the current dialogue scene. The information correction module 57 is configured to correct the first translation information and output same according to the associated information.

In the dialogue scene determination module 52, some dialogue scenes may be preset, and a rule may be determined. For example, the dialogue scene may include an entertainment venues talking scene, a business talking scene, an academic discussing scene, a railway station talking scene, an airplane talking scene, and the like. The current dialogue scene may be determined according to a key word in the first recognition information. For example, when the key word is a place name of a scenery spot, it is determined that the current dialogue scene is a tourism scene. The current dialogue scene may also be recognized according to a key word in historical recognition information which has been confirmed by the first user in a preset time period. The information which has been confirmed by the first user before confirming the first recognition information is the historical recognition information. Definitely, the dialogue scene may also be selected by the user.

In the degree of confidence determination module 53, the key word in the current dialogue scene may be a common word in the scene, or a rare word in the scene. Therefore, the first recognition information may be compared with the key word of the current dialogue scene. The degree of confidence is determined according to the probability of the common words and/or rear words included currently. The language rule may be a grammar rule, and the language rule may include, but not limited to, time, place, character, and event.

In the user confirmation module 54, the first user is prompted in a visual manner to confirm the first recognition information, such as by popping a box, a prompt confirm key, and the like. The first user may also be prompted in an audio manner to confirm the first recognition information, for example, by playing prompt voice information.

The on-line voice translation device disclosed in Embodiment 5 adds the scene management of dialogue, and further optimizes the accuracy of determining the degree of confidence and determining the associated information.

An embodiment of the present invention further provides a storage medium including computer executable instructions being able to be executed by a computer processor to execute an on-line voice translation method, where the method includes:

conducting voice recognition on first voice information input by a first user, so as to obtain first recognition information;

prompting the first user to confirm the first recognition information;

translating the confirmed first recognition information to obtain and output first translation information;

extracting, according to second information which is fed back by a second user, associated information corresponding to the second information; and correcting the first translation information according to the associated information and outputting the corrected translation information.

The on-line voice translation device may execute the on-line voice translation method provided in any embodiment of the present invention, and has corresponding functional modules and beneficial effects.

Figure 6:
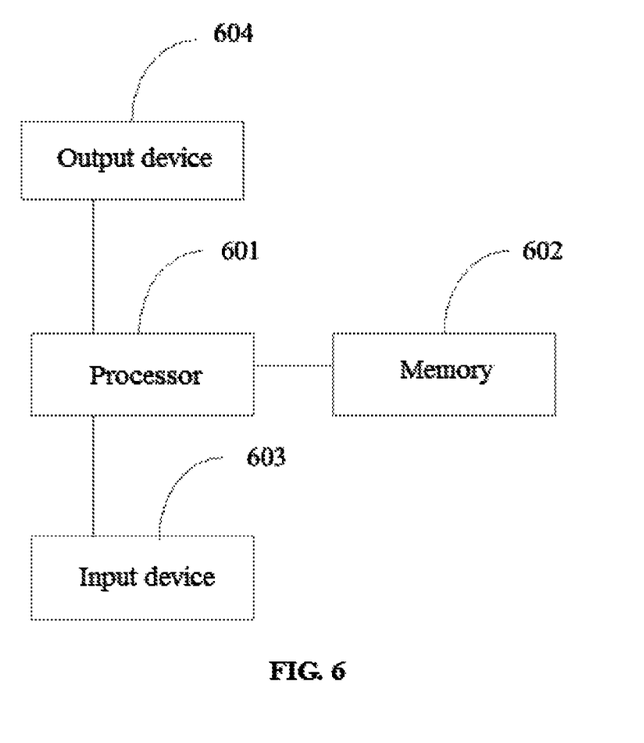
FIG. 6 is a hardware structural diagram of a terminal apparatus executing an on-line voice translation method according to an embodiment of the present invention.

Referring to FIG. 6, an embodiment of the present invention provides a hardware structure of a terminal apparatus executing an on-line voice translation method. The terminal apparatus includes a processor 601, a memory 602, an input device 603 and an output device 604. The number of the processors 601 in the terminal apparatus may be one or more, although one processor 601 is contained in FIG. 6 as an example. The processor 601, the memory 602, the input device 603 and the output device 604 in the terminal apparatus may be connected by a bus or in another manner. In FIG. 6, the connection is achieved by a bus as an example.

The memory 602, as a computer readable storage medium, may be used to store software programs, computer executable programs and modules, for example, program instructions/modules corresponding to the on-line voice translation method in the embodiments of the present invention (for example, the first recognition information module 41, the confirmation prompt module 42, the information translation module 43, the associated information extraction module 44 and the information correction module 45 in the on-line voice translation devices shown in FIG. 4 to FIG. 5). The processor 601 executes the software programs, instructions and modules stored in the memory 602, so as to execute various functional applications and data processing of the terminal apparatus, thereby implementing the on-line voice translation method in the method embodiments.

The memory 602 may include a program storage region and a data storage region, where the program storage region may store an operating system and an application program required by at least one function; and the data storage region may store data created according to use of the terminal apparatus, and the like. Moreover, the memory 602 may include a high-speed random access memory, and may also include a non-volatile memory, for example, at least one disk storage device, a flash device, or other non-volatile solid-state storage memories. In some examples, the memory 602 may further include memories remotely disposed with respect to the processor 601, and the remote memories may be connected to a server through a network. An example of the network includes, but not limited to, the Internet, the Intranet, the local area network, the mobile communication network, and combinations thereof.

The input device 603 may be used to receive input audio information, and generate an audio signal input related to user settings and function control of the terminal. The output device 504 may include a display apparatus such as a display screen.

The processor 601 may execute the following steps: conducting voice recognition on first voice information input by a first user, so as to obtain first recognition information; prompting the first user to confirm the first recognition information; translating the confirmed first recognition information to obtain and output first translation information; extracting, according to second information which is fed back by a second user, associated information corresponding to the second information; and correcting the first translation information according to the associated information and outputting the corrected translation information.

Further, when the processor 601 prompts the first user to confirm the first recognition information, it is specifically implemented as: determining a degree of confidence of the first recognition information; and prompting the first user to confirm the first recognition information according to the degree of confidence of the first recognition information. The degree of confidence of the first recognition information is determined according to at least one of a key word and/or a language rule in a current dialogue scene.

Further, when the processor 601 prompts the first user to confirm the first recognition information according to the degree of confidence of the first recognition information, it is specifically implemented as: if the degree of confidence of the first recognition information is lower than a first preset threshold, displaying the first recognition information for the first user to confirm; or if the degree of confidence of at least one key word in the first recognition information is lower than a second preset threshold, displaying the key word for the first user to confirm.

Further, when the processor 601 extracts the associated information corresponding to the second information which is fed back by the second user, it is specifically implemented as: conducting key word similarity matching on the second information which is fed back by the second user with the confirmed first recognition information, and extracting a matched key word to serve as the associated information corresponding to the second information.

Further, when the processor 601 extracts the associated information corresponding to the second information which is fed back by the second user, it is specifically implemented as: extracting the associated information corresponding to the second information from the confirmed first recognition information according to a key word and/or a language rule in a current dialogue scene. The current dialogue scene is determined according to the first recognition information, or recognized according to a key word in historical recognition information which has been confirmed by the first user.

Based on the foregoing descriptions of the implementation manners, a person skilled in the art may clearly understand that the present invention may be implemented by software in addition to necessary universal hardware platform, and definitely, may also be implemented by hardware. However, in most situations, the former is a more preferable implementation manner. Based on such understanding, the technical solutions of the present invention essentially or the part contributing to the prior art may be implemented in a form of a software product. The computer software product may be stored in a computer readable storage medium, such as a floppy disk of the computer, a read-only memory (ROM), a random access memory (RAM), a FLASH, a hard disk, or an optical disc, and includes several instructions for instructing a computer device (which may be a personal computer, a server, or a network device) to perform the methods described in the embodiments of the present invention.

It should be noted that, although various included units and modules in the embodiment of the search device are divided according to functional logics, the present invention is not limited to the above division. The invention can be implemented as long as corresponding functions can be implemented. In addition, specific names of the functional units are used for convenient distinguishing, and are not used to limit the protection scope of the present invention.

It should be noted that, the above descriptions are merely the preferred embodiments and used technical principles of the present invention. A person skilled in the art should understand that the present invention is not limited to the specific embodiments herein, and for a person skilled in the art, various obvious variations, readjustments and replacements may be made without departing from the protection scope of the present invention. Therefore, although the present invention is described in detail through the above embodiments, the present invention is not merely limited to the above embodiments. More other equivalent embodiments may further be included without departing from the conception of the present invention. The scope of the present invention is defined by the appended claims.

The invention claimed is:

1. An on-line voice translation method, comprising:
conducting voice recognition on first voice information input by a first user, so as to obtain first recognition information;
determining a degree of confidence of the first recognition information;
prompting the first user to confirm the first recognition information according to the degree of confidence of the first recognition information;

translating the confirmed first recognition information to obtain and output first translation information;
extracting, according to second information which is fed back by a second user, rectification information corresponding to the second information; and
correcting the first translation information according to the rectification information and outputting the corrected translation information,
wherein determining the degree of confidence of the first recognition information comprises:
determining the degree of confidence of the first recognition information according to a grammar rule in a current dialogue scene, wherein the degree of confidence of the first recognition information is determined to be high when the first recognition information meets the grammar rule in the scene, and the degree of confidence of the first recognition information is determined to be low when the first recognition information does not meet the grammar rule in the scene.

2. The method of claim 1, wherein prompting the first user to confirm the first recognition information according to the degree of confidence of the first recognition information comprises:
if the degree of confidence of the first recognition information is lower than a first preset threshold, displaying the first recognition information for the first user to confirm; or
if the degree of confidence of at least one key word in the first recognition information is lower than a second preset threshold, displaying the key word for the first user to confirm.

3. The method of claim 1, wherein extracting, according to second information which is fed back by a second user, rectification information corresponding to the second information comprises:
conducting key word similarity matching on the second information which is fed back by the second user with the confirmed first recognition information, and extracting a matched key word to serve as the rectification information.

4. The method of claim 1, wherein extracting, according to second information which is fed back by a second user, rectification information corresponding to the second information comprises:
extracting the rectification information corresponding to the second information from the confirmed first recognition information according to a key word and/or a language rule in a current dialogue scene.

5. The method of claim 1, further comprising:
determining the current dialogue scene according to the first recognition information, or recognizing the current dialogue scene according to a key word in historical recognition information which has been confirmed by the first user.

6. An on-line voice translation device, comprising:
a first recognition information module, configured to conduct voice recognition on first voice information input by a first user, so as to obtain first recognition information;
a confirmation prompt module, configured to prompt the first user to confirm the first recognition information;
an information translation module, configured to translate the confirmed first recognition information to obtain and output first translation information;
a rectification information extraction module, configured to extract, according to second information which is fed back by a second user, rectification information corresponding to the second information; and
an information correction module, configured to correct the first translation information according to the rectification information and output the corrected translation information,
wherein the confirmation prompt module comprises:
a degree of confidence determination module, configured to determine a degree of confidence of the first recognition information according to a grammar rule in a current dialogue scene, wherein the degree of confidence of the first recognition information is determined to be high when the first recognition information meets the grammar rule in the scene, and the degree of confidence of the first recognition information is determined to be low when the first recognition information does not meet the grammar rule in the scene; and
a user confirmation module, configured to prompt the first user to confirm the first recognition information according to the degree of confidence of the first recognition information.

7. The device of claim 6, wherein the confirmation prompt module is specifically configured to:
if the degree of confidence of the first recognition information is lower than a first preset threshold, display the first recognition information for the first user to confirm; or
if the degree of confidence of at least one key word in the first recognition information is lower than a second preset threshold, display the key word for the first user to confirm.

8. The device of claim 6, wherein the rectification information extraction module comprises:
a key word matching sub-module, configured to conduct key word similarity matching on the second information which is fed back by the second user with the confirmed first recognition information, and extract a matched key word to serve as the rectification information.

9. The device of claim 6, wherein the rectification information extraction module comprises:
a language rule sub-module, configured to extract the rectification information corresponding to the second information from the confirmed first recognition information according to a key word and/or a language rule in a current dialogue scene.

10. The device of claim 6, further comprising:
a dialogue scene determination module, configured to determine the current dialogue scene according to the first recognition information, or recognize the current dialogue scene according to a key word in historical recognition information which has been confirmed by the first user.

11. A non-transitory computer readable medium comprising computer executable instructions, the computer executable instructions, when being executed by a computer processor, executing an on-line voice translation method, wherein the method comprises:
conducting voice recognition on first voice information input by a first user, so as to obtain first recognition information;
determining a degree of confidence of the first recognition information;
prompting the first user to confirm the first recognition information according to the degree of confidence of the first recognition information;

translating the confirmed first recognition information to obtain and output first translation information;

extracting, according to second information which is fed back by a second user, rectification information corresponding to the second information; and correcting the first translation information according to the rectification information and outputting the corrected translation information, wherein determining the degree of confidence of the first recognition information comprises:

determining the degree of confidence of the first recognition information according to a grammar rule in a current dialogue scene, wherein the degree of confidence of the first recognition information is determined to be high when the first recognition information meets the grammar rule in the scene, and the degree of confidence of the first recognition information is determined to be low when the first recognition information does not meet the grammar rule in the scene.

12. The method of claim 4, further comprising:

determining the current dialogue scene according to the first recognition information, or recognizing the current dialogue scene according to a key word in historical recognition information which has been confirmed by the first user.

13. The device of claim 9, further comprising:

a dialogue scene determination module, configured to determine the current dialogue scene according to the first recognition information, or recognize the current dialogue scene according to a key word in historical recognition information which has been confirmed by the first user.

* * * * *